US007392103B2

(12) United States Patent
Takahashi

(10) Patent No.: US 7,392,103 B2
(45) Date of Patent: Jun. 24, 2008

(54) AUDIO SIGNAL PROCESSING DEVICE

(75) Inventor: Daisuke Takahashi, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 769 days.

(21) Appl. No.: 10/898,725

(22) Filed: Jul. 23, 2004

(65) Prior Publication Data

US 2005/0019021 A1 Jan. 27, 2005

(30) Foreign Application Priority Data

Jul. 25, 2003 (JP) ............................. 2003-201552
Jul. 25, 2003 (JP) ............................. 2003-201554

(51) Int. Cl.
*G06F 17/00* (2006.01)

(52) U.S. Cl. .......................................... 700/94; 381/119

(58) Field of Classification Search ................... 84/625; 381/119; 700/94
See application file for complete search history.

(56) References Cited

U.S. PATENT DOCUMENTS

2004/0159218 A1* 8/2004 Aiso et al. .................... 84/625

OTHER PUBLICATIONS

Owner's Manual, Digital Production Console DM 2000, Yamaha Corporation, Pro Audio & Digital Musical Instrument Division, 348 pages, 2002.

* cited by examiner

*Primary Examiner*—Sinh Tran
*Assistant Examiner*—Walter F Briney, III
(74) *Attorney, Agent, or Firm*—Morrison & Foerster LLP

(57) ABSTRACT

In an audio signal processing device which processes audio signals and outputs the audio signals, on the recalling setting data representing a setting status of the device, protection setting defining a group which is not recalled at the time of recalling the setting data among a plurality of groups constituting the setting data is accepted as a local setting for each setting data and a global setting common to each setting data separately, and an enabled or disabled setting of the protection setting for the setting data is accepted for each setting data, wherein when the setting data is recalled, the recall is performed in accordance with the local protection setting when the protection setting for the setting data is enabled, and in accordance with the global protection setting when the protection setting for the setting data is disabled.

8 Claims, 8 Drawing Sheets

AUDIO SIGNAL PROCESSING DEVICE

BACKGROUND OF THE INVENTION

1. Field of the Invention

The invention relates to an audio signal processing device which processes audio signals and outputs the audio signals, and a computer program for causing a computer to function as such an audio signal processing device.

2. Description of the Related Art

In an audio signal processing device such as a digital mixer or the like which processes audio signals and outputs the audio signals, generally the audio signal processing is controlled in accordance with current data representing the current status of the device, and the current data is changed in accordance with operation of controls to enable edition of the contents of the audio signal processing. For the current data, such processing is performed that a user selects a scene number and gives an instruction of "store", whereby the data is stored in a scene memory as a scene (setting data) of the selected number, and that conversely the user selects a scene number and gives an instruction of "recall", whereby the scene of the number can be loaded and made the current data. Such a function is provided to enable wide-ranging setting to be loaded by a simple operation and reflected on the signal processing.

In addition, an audio signal processing device provided with such a store/recall function is also known in which, at the time of recalling a scene, part of data included in the scene is omitted from recall object so that current data before the recall can be left as it is.

In the owner's manual of "DM2000 (trade name)" commercially available from YAMAHA Co. Ltd., for example, a digital mixer is described in which data of a scene is divided into a plurality of groups for each of which protection setting determining whether the parameters are affected or unaffected by a recall can be made. In this digital mixer, the protection setting can be made for each input channel or each output channel, for each parameter group in a selected channel, or for each effector.

Processing executed at the time of recalling a scene in such a digital mixer is, for example, one shown in a flowchart of FIG. 9.

More specifically, first, in Step S101, data of a selected scene is loaded from a setting data memory into a work memory. Then, in Step S102, setting is made such that the contents of a current memory during rewriting are not reflected on the control of the signal processing and the like until the rewriting at the time of recall is finished.

Thereafter, through the processing in Steps S103 to S107, the protection settings are referred to for each group, and only parameters of the group for which being unaffected by a recall (protection) is not set are loaded from the work memory and written over corresponding data of the current data stored in the current memory so as to be made current data.

After the overwriting of all the necessary parameters is finished, setting is made such that the contents of the current memory are reflected again on the control in Step S108, and the processing is ended.

By performing the processing described above, original current data can be left without change for the parameters for which the protection is set even at the time of recalling the scene. Consequently, the digital mixer described above enables operation of recalling only part of a scene or of recalling a scene while holding parameters which are desired to be manually controlled depending on the situation on each occasion, leading to improved operability of the recall function.

However, the channels and parameters which are desired to be omitted from the object to be recalled may often be different depending on scenes. In such a case, in the digital mixer described in the aforementioned owner's manual of "DM2000 (trade name)," the setting of being affected/unaffected by a recall needs to be performed again every time the channels and parameters which are desired to be omitted from the recall object change, bringing about a problem that the operation becomes complicated.

SUMMARY OF THE INVENTION

To solve such a problem, it is conceivable to enable to set being affected/unaffected by a recall for each parameter group for each scene in addition to the setting for the whole mixer. Then, where a scene is recalled, its parameters for which being unaffected by a recall is set in at least one of the setting for the whole and the setting for each scene are omitted from the recall object. YAMAHA Co. Ltd., the assignee of the present application, has filed a patent application on such a technology in Japan (JP 2003-34688: unpublished).

By such a method, being affected/unaffected by a recall can be individually set for each scene, so that the parameter group being a recall object can be changed for each scene without modifying the setting for the whole mixer. In this method, however, when both the setting for the whole mixer and the setting for each scene are effective, which parameters of the scene will be finally recalled is recognized only after confirmation of both the settings, thus presenting a problem that parameters to be recalled are hard to know.

Besides, a conventional digital mixer is configured such that at the time of transferring data of parameters from the work memory to the current memory, the protection setting is confirmed for each group in sequence, and data of a group for which no protection is set is transferred. Accordingly, the amount of data sent in one time of transfer is necessarily small. In addition, this processing is, so to speak, processing of filtering data of a scene, and therefore whether or not transfer is performed needs to be judged for all of the groups.

On the other hand, the protection is often set so that only part of the data cannot be recalled and almost all of the data can be recalled. In such a case, even though almost all of the setting data is finally transferred to the current memory in the aforementioned method, transfer of a small amount of separated data will be repeated many times. In other words, it will be necessary to perform the transfer the number of times equal to the number of groups which can be recalled. Thus, the processing causes more loads, leading to a problem that the recall processing takes more time.

It is an object of the invention to solve the problems described above and to make it possible, in an audio signal processing device which processes audio signals and outputs the audio signals, to predict the result of the recall processing with ease while enabling the parameter being a recall object to be changed for each setting data without modifying the setting for the whole device. It is another object to increase the speed of the recall processing of the setting data.

To attain the above objects, the audio signal processing device of the invention is an audio signal processing device which processes audio signals and outputs the audio signals, including: a setting data memory for storing a plurality of setting data each including a plurality of groups of data representing a setting status of the device; a current memory for storing current data representing a current status of the device; a controller for controlling the signal processing based on the current data; a recaller for recalling the setting data stored in the setting data memory and making the data the current data; a first handler for accepting protection setting as a setting for each of the setting data and a setting common to each of the setting data separately, the protection setting defining a group which is not recalled at the time of recalling by the recaller among the plurality of groups constituting the setting data; and a second handler for accepting an enabled or disabled setting of the protection setting for each of the setting data, wherein when recalling the setting data, the recaller performs a recall in accordance with the protection setting for the setting data when the protection setting for the setting data is enabled, and in accordance with the protection setting common to each of the setting data when the protection setting for the setting data is disabled.

In the audio signal processing device described above, it is preferable to provide a third handler for temporarily disabling all the protection setting for each of the setting data.

Further, this invention also provides an audio signal processing device which processes audio signals and outputs the audio signals, including: a setting data memory for storing a plurality of setting data each including a plurality of groups of data representing a setting status of the device; a current memory for storing current data representing a current status of the device; a controller for controlling the signal processing based on the current data; a recaller for recalling the setting data stored in the setting data memory to the current memory as the current data; and a protection accepting handler for accepting protection setting defining a group which is not recalled at the time of recalling by the recaller among the plurality of groups, wherein the recaller includes: a handler for recalling setting data to be recalled from the setting data memory to a work memory; a protector for loading data of a group which is defined as not being recalled by the protection setting among the current data from the current memory, and writing the data over corresponding data of the setting data recalled to the work memory; and a current data switcher for causing the setting data stored in the work memory to be used as the current data after completion of the overwriting for all necessary data by the protector.

In the audio signal processing device described above, it is preferable that the current data switcher causes the setting data stored in the work memory to be used as the current data by copying contents of the work memory to the current memory.

Alternatively, it is also adoptable that the current data switcher causes the setting data stored in the work memory to be used as the current data by changing at least a part of the work memory into the current memory.

Further, in these audio signal processing devices, it is preferable that the protection accepting handler is provided with a handler for accepting the protection setting in a first mode of accepting selection of a group which is not recalled and a second mode of accepting selection of a group which is recalled, and that when the protection accepting handler accepts the protection setting in the second mode, the protector and the current data switcher are not operated, and the recaller loads data of a group which is recalled among the setting data to be recalled from the setting data memory and writes the data over corresponding data of the current data stored in the current memory.

Further, the computer program of the invention is a computer program containing program instructions executable by a computer and causing the computer to execute: a process of processing audio signals and outputting the audio signals; a process of storing in a setting data memory a plurality of setting data each including a plurality of groups of data representing a setting status on the signal processing; a process of storing in a current memory current data representing a current setting status of the signal processing; a recall process of recalling the setting data stored in the setting data memory and making the data the current data; a process of accepting protection setting as a setting for each of the setting data and a setting common to each of the setting data separately, the protection setting defining a group which is not recalled at the time of recalling in the recall process among the plurality of groups constituting the setting data; and a process of accepting an enabled or disabled setting of the protection setting for each of the setting data, wherein, in the recall process, at the time of recalling the setting data, the recall is performed in accordance with the protection setting for the setting data when the protection setting for the setting data is enabled, and in accordance with the protection setting common to each of the setting data when the protection setting for the setting data is disabled.

In the computer program described above, it is preferable to further contain program instructions causing the computer to execute a process of temporarily disabling all the protection settings for each of the setting data.

The above and other objects, features and advantages of the invention will be apparent from the following detailed description which is to be read in conjunction with the accompanying drawings.

DETAILED DESCRIPTION OF THE PREFERRED EMBODIMENTS

Hereinafter, a preferred embodiment of the invention will be described with reference to the drawings.

Figure 1:
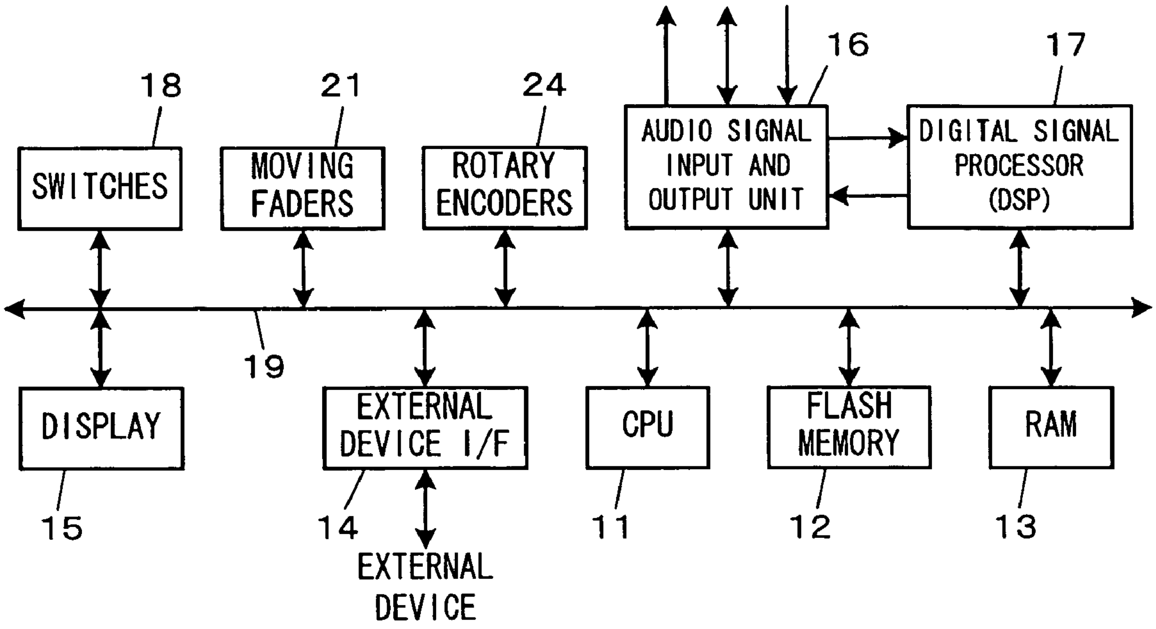
FIG. 1 is a block diagram showing a configuration of a digital mixer being an embodiment of an audio signal processing device of the invention.

A configuration of a digital mixer being an embodiment of an audio signal processing device of the invention will be described first using FIG. 1. FIG. 1 is a block diagram showing the configuration of the digital mixer.

As shown in FIG. 1, the digital mixer (hereafter, also referred to only as a "mixer") comprises a CPU 11, a flash memory 12, a RAM 13, an external device interface (I/F) 14, a display 15, an audio signal input and output unit 16, a digital signal processor (DSP) 17, switches 18, moving faders 21, and rotary encoders 24, which are connected by a system bus 19. The digital mixer has a function of subjecting inputted audio signals to various kinds of signal processing and outputting the signals.

The CPU 11, which is a controller that comprehensively controls operation of the whole mixer based on current data and so on which will be described later, executes a predetermined program stored in the flash memory 12 to detect operations of the switches 18, the moving faders 21, and the rotary encoders 24 so as to change parameter values in accordance with the operations, to store and recall setting data and to control the operation of the DSP 17 in accordance with set parameters.

The flash memory 12 is a rewritable non-volatile memory that stores a control program executed by the CPU 11, and so on.

The RAM 13 is a memory that functions as a current memory to store current data being the setting data representing the current status of the mixer, functions as a setting data memory to store a later-described library of the setting data, and is used as a work memory of the CPU 11. As matter of course, the RAM 13 can accomplish these functions at the same time. Note that the CPU 11 controls the current action of the whole mixer based on the current data stored in the RAM 13.

The external device I/F 14 is an interface for transferring information with external devices such as a personal computer and the like connected to the mixer.

The display 15 is a display provided on a console panel of the mixer and composed of a liquid crystal display (LCD) or the like. The display 15 is constituted of a display 50 which displays a screen for referring to, modifying, storing, and so on the setting, an operating status of the mixer, and so on; a scene number display 42 which displays the number of a scene to be stored/recalled; and so on.

The audio signal input and output unit 16 is an interface for receiving input of audio signals to be processed in the DSP 17 and outputting processed audio signals. A plurality of A/D conversion boards each capable of analog input of four channels, D/A conversion boards each capable of analog output of four channels, and digital input and output boards each capable of digital input and output of eight channels, can be installed in combination as necessary into the audio signal input and output unit 16, which actually inputs and outputs signals through the boards.

The DSP 17 is a module that processes audio signals inputted from the audio signal input and output module in accordance with the values of various parameters set as the current data. The processing will be described later in detail.

The switches 18, moving faders 21, and rotary encoders 24 are controls provided on the console panel of the mixer for a user to set parameters on processing of audio signals. The moving faders 21 of them are slider controls having a motor, so that their knobs are movable to designated positions also by an instruction from the CPU 11. The rotary encoders 24 have a function of detecting the rotation amounts of their knobs as manipulation degrees. The switches 18 should denote various kinds of controls other than the moving faders 21 and rotary encoders 24 provided on the console panel.

Figure 2:
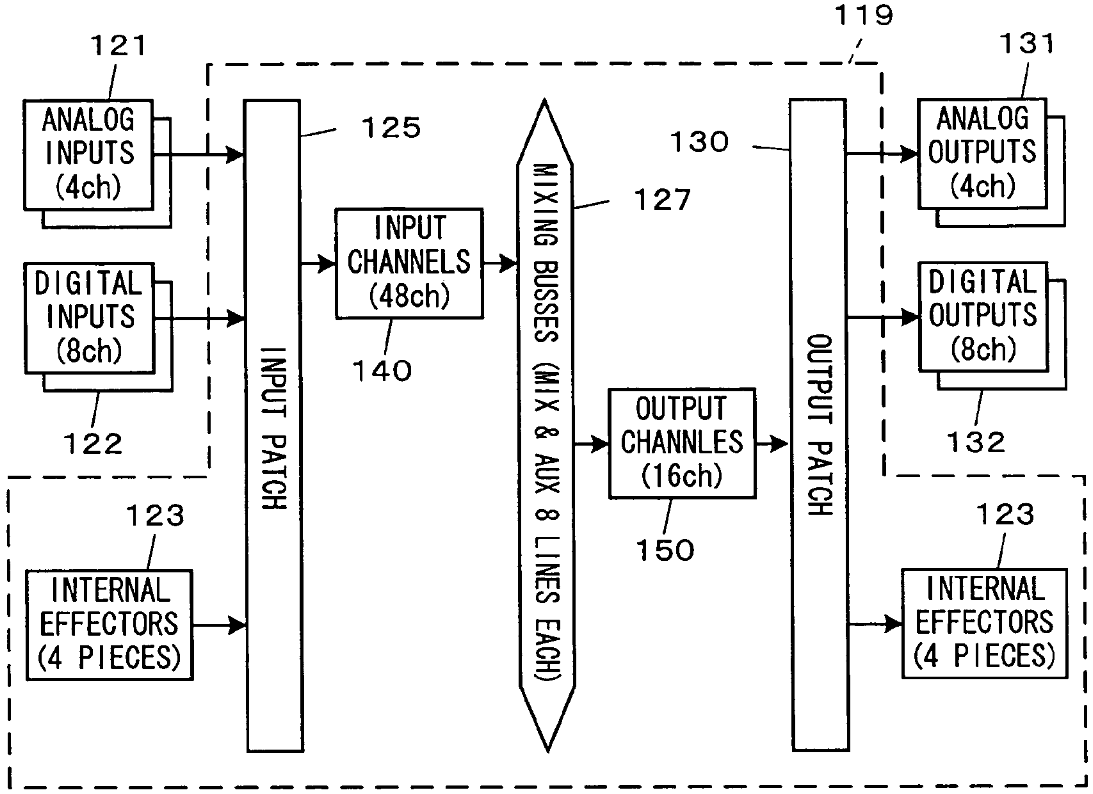
FIG. 2 is a block diagram showing in more detail the configuration of a DSP shown in FIG. 1.

The configuration of the aforementioned DSP 17 is illustrated in more detail here in FIG. 2. The DSP 17 includes, for executing mixing processing, as shown in FIG. 2, internal effectors 123, an input patch 125, input channels 140, various busses 127, output channels 150, and an output patch 130. Analog inputs 121, digital inputs 122, analog outputs 131, and digital outputs 132 represent input and output modules implemented by the above-described boards to be installed into the audio signal input and output unit 16.

The internal effectors 123 are composed of plural blocks of effectors that apply selected effects to inputted signals and output the signals. The channel configuration of the internal effector 123 is changeable between monaural, stereo, and so on.

The input patch 125 performs optional patch for assigning signals inputted from the inputs of the analog inputs 121 and digital inputs 122, and the internal effectors 123 to the input channels 140, having 48 channels. The input signals assigned by the input patch 125 are inputted into respective channels of input channels 140.

Figure 3:
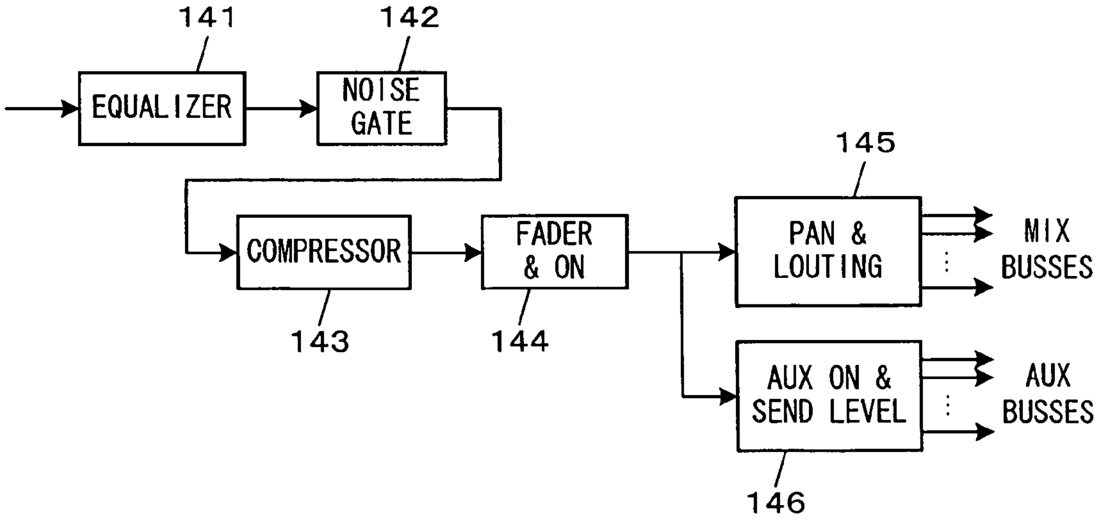
FIG. 3 is a block diagram showing a configuration of one channel constituting an input channel shown in FIG. 2.

The configuration of one of the channels constituting the input channels 140 is shown in FIG. 3. Each channel of the input channels 140 includes, as shown in FIG. 3, an equalizer 141, a noise gate 142, a compressor 143, a fader & ON 144, a pan & routing 145, and an AUX ON & send level 146. The equalizer 141 is a parametric equalizer with three bands LOW, MID, and HIGH, the noise gate 142 is a gate for closing (cutting off a signal line) when the signal level drops to prevent noise from remaining, the compressor 143 is a module for performing automatic gain adjustment, and the fader & on 144 is a module having a volume for level (sound volume) adjustment and a function of setting ON/OFF of output.

In the input channels 140, these modules perform predetermined processing for inputted signals and output the processed signals to the various busses 127, with the signals being outputted to MIX busses through the pan & routing 145. This module is composed of a pan for setting the balance between right and left in outputting the signals to a stereo bus and a routing for setting the presence or absence of output to each bus. On the other hand, the signals are outputted to the AUX buses through the AUX ON & send level 146. This module is composed of an AUX ON for setting the presence or absence of output to each bus and a send level for setting the level of output to each bus.

Here, it is possible to output the signal from one input channel to plural busses, and also to output the signals from plural input channels to one bus. The signals inputted to the various busses 127 are outputted to corresponding output channels 150. In this event, the bus, into which signals are inputted from plural input channels 140, performs mixing processing for these signals.

Sixteen output channels 150 are provided to correspond to the various busses 127 on a one-to-one basis. Each of the channels includes modules corresponding to the equalizer 141, the noise gate 142, the compressor 143, and the fader & ON 144 of the configuration of the input channel shown in FIG. 3. In the output channel 150, these modules perform predetermined processing for inputted signals and output the processed signals to the output patch 130.

The output patch 130 performs optional patch of assigning the signals inputted from the output channels 150 to outputs of the analog outputs 131 and digital outputs 132, and the internal effectors 123. The signal from one output channel can be assigned even to plural outputs. The signals assigned to the analog outputs 131 or digital outputs 132 are outputted therefrom, and the signals assigned to the internal effectors 123 are processed therein and then inputted again into the input patch 125.

It should be noted that the DSP 17 can also mix signals selected from the input channels 140 and the output channels 150 and output the mixed signal to an output for a monitor not shown.

These elements of the above-described DSP 17 may be realized by circuits or by arithmetic processing.

Figure 4:
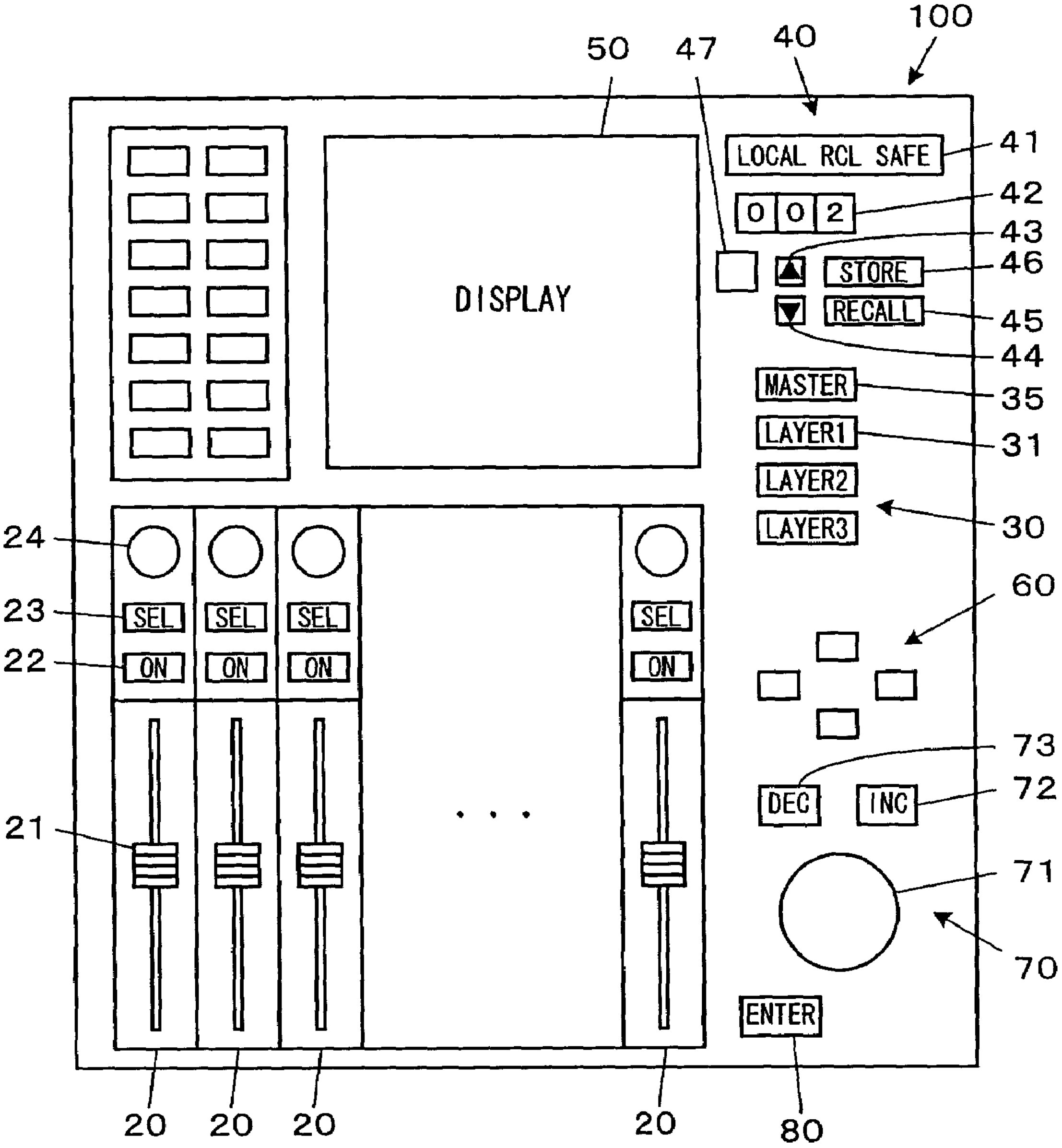
FIG. 4 is a drawing showing a schematic configuration of a console panel of the digital mixer shown in FIG. 1.

Next, a schematic configuration of the console panel of the digital mixer is shown in FIG. 4.

The console panel 100 including the display 50 is for instructing change of parameters for use in signal processing in the DSP 17 and so on and editing the parameters, by operating various controls while referring to the display screen displayed on the display 50. As the controls for the operation, channel strips 20, a layer selection key group 30, cursor keys 60, increase/decrease controls 70, and an enter key 80, and so on are provided. Further, in a scene operation section 40, controls and displays for accepting operation and displaying on store and recall of scenes (setting data) are provided.

The functions of the controls in portions other than the scene operation section 40 will be schematically described first.

As for the channel strips 20, 16 channel strips 20 are provided here side by side. Each of the channel strips 20 includes the moving fader 21 for setting the output level, an ON switch 22 for setting ON/OFF, a selection switch 23 for selecting a corresponding channel, and the rotary encoder 24 to which a parameter selected by a user is assigned and which is used for controlling the parameter. If there is no problem in terms of cost and space, additional controls and rotary encoders corresponding to other parameters may be provided.

To each of the channel strips 20, any one of the input channels 140 or output channels 150 shown in FIG. 2 is assigned, and the controls of the channel strip 20 basically function as controls for controlling parameters of the channel and setting their values.

Assignment of channels to the channel strips 20 is performed using layers. Each key of the layer selection key group 30 is a key for selecting one from among the layers to assign channels to the channel strips 20. For example, a press of a layer 1 selection key 31 enables the first layer to be selected, thereby assigning the first to 16th input channels to the respective channel strips 20. Other layers can be selected by pressing other layer selection keys. Further, a layer to which the output channels 150 is assigned is separately prepared as a master layer, which is configured to be selectable by a master layer selection key 35.

The cursor keys 60 are controls for operating the cursor displayed in the display screen (not limited to a later-described recall safe setting screen 200) of the display 50. The increase/decrease controls 70 are controls for increasing/decreasing the parameter displayed at the position of the cursor in the display screen. The increase/decrease controls 70 are composed of a rotary encoder 71, and an increase key 72 and a decrease key 73, either of which can be used to instruct an increase or a decrease. A press of the enter key 80 after the setting of the increase or decrease enables the value after the change to be effective. Note that as for continuously changeable parameters, values after changes are made effective every time an increase or decrease is instructed.

The parameters can be edited also by sequentially selecting parameters desired to be changed on the display screen of the display 15 and instructing changes by means of the controls.

The function of the scene operation section 40 will be described next.

This mixer has a function of storing a plurality of setting data representing the setting status of the device as scenes with numbers respectively in a library form in the setting data memory on the RAM 13 in advance, loading an arbitrary scene from among them in accordance with the operation by a user and making it current data, and controlling the operation of the whole mixer including signal processing in the DSP 17 in accordance with the current data. The scene operation section 40 is a section having a function of accepting the operation for instructing store and recall of the scene, and displaying.

As shown in FIG. 4, in the scene operation section 40, a protection status display 41, a scene number display 42, an up-key 43, a down-key 44, a recall key 45, a store key 46, and a recall safe setting screen display key 47 are provided. Among them, the displays 41 and 42 correspond to the display 15 in FIG. 1, and the other keys 43 to 47 correspond to the switches 18.

The protection status display 41 is a display for displaying thereon the status which protection setting is to be reflected on the scene of the number displayed at present on the scene number display 42. The protection setting and its kinds will be described later.

The scene number display 42 is a display for displaying the number of a scene to be a recall object or a store destination in three digits, and changes numbers in an ascending order when the up-key 43 is pressed and in a descending order when the down-key 44 is pressed.

When a desired number is selected by the keys and then the recall key 45 is pressed, a scene having the number is loaded from the setting data memory and made current data, whereby recall is accomplished. In accordance with the new current data, the signal processing in the DSP 17 is controlled, and the display data on the display 50 and the positions of the moving faders 21 are changed. Note that the setting data loaded here is to be finally stored in the current memory on the RAM 13 as current data, and there are several possible ways for processing until then, which will be described later.

When the moving faders 21, switches 18, and so on are operated after the display data on the display 50 and the positions of the moving faders 21 are changed, the current data is modified accompanying the operation. Accordingly, the scene can be edited by the operation of the faders 21, the switches 18, and so on. Upon a press of the store key 46, the current data at this point in time is stored, as a scene of the selected number, in the setting data memory. The processing of recalling, editing, and storing the scene are performed by control of the CPU 11.

The contents of the setting data memory can be stored in the flash memory 12 in response to a save instruction by the user, and conversely, the library of the setting data stored in the flash memory 12 can be loaded into the setting data memory on the RAM 13 in response to a load instruction by the user. These operations are different from recall and store for each scene described here, and designed such that each scene can be edited in detail while kept stored in the setting data memory on the RAM 13, and the final results after all required scenes are edited can be stored in the flash memory 12 because the flash memory 12 is limited in the number of rewrites.

Figure 5:
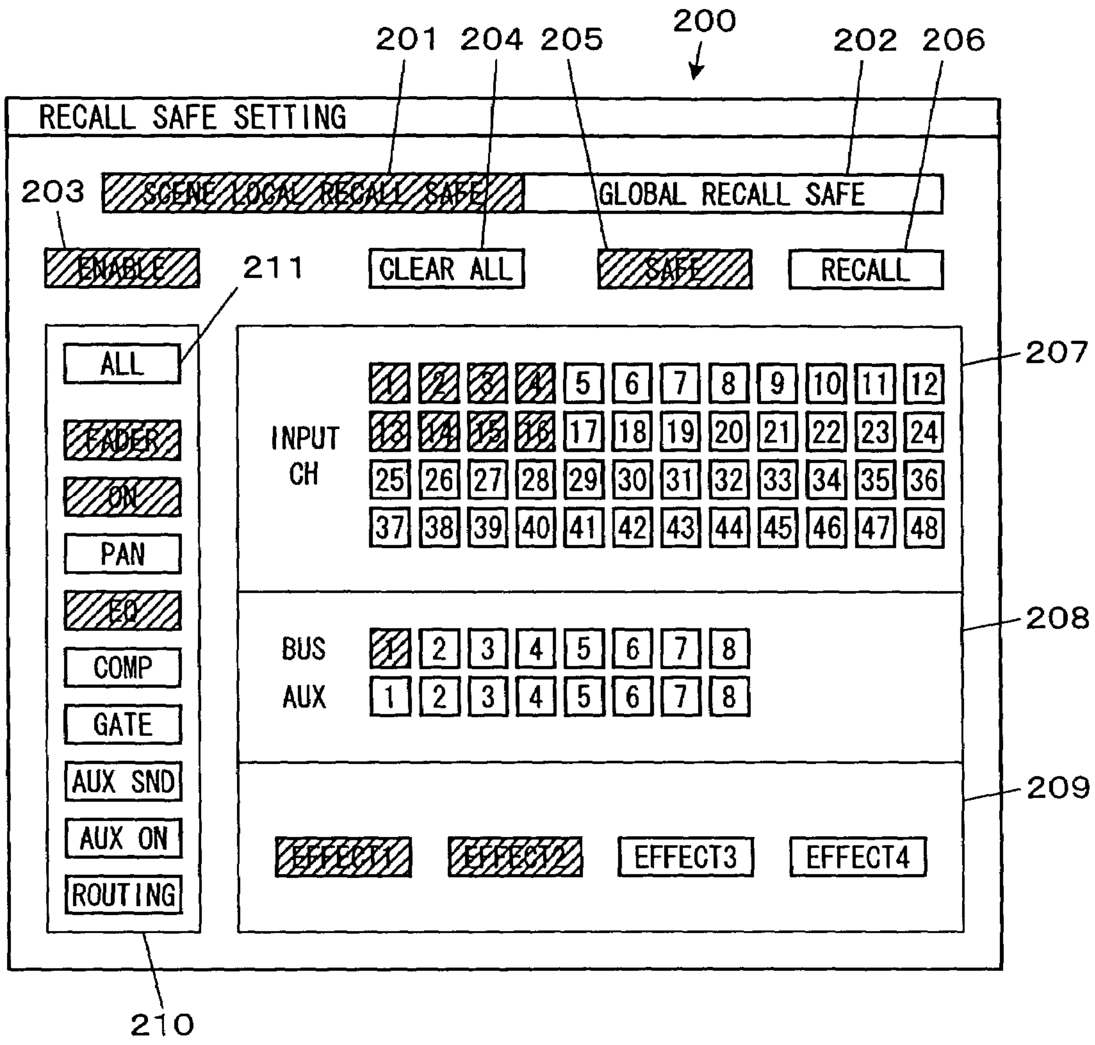
FIG. 5 is a drawing showing an example of a recall safe setting screen displayed on a display shown in FIG. 4.

The recall safe setting screen display key 47 is a key for causing the display 50 to display the recall safe setting screen 200. A display example of the screen is shown in FIG. 5. Note that hatchings in this drawing represent that keys with them are in an ON state or in a selected state. Besides, a press of a key on the screen can be accomplished using the cursor keys 60 and the enter key 80, a pointing device such as a trackball or the like, a touch panel, or the like.

The recall safe setting screen 200 is a screen for accepting, protection setting which defines parameters which are not recalled, and existing current data thereof is left when recalling a scene. The recall safe setting screen 200 comprises, as shown in FIG. 5, a local setting key 201, a global setting key 202, an enabled/disabled key 203, a clear all key 204, a safe mode key 205, and a recall mode key 206 which are for performing general operation, and an input channel selection section 207, a bus selection section 208, an effector selection section 209, and a parameter selection section 210 where keys for selecting channels, parameters, and so on for which the protection setting is made are provided.

First of all, the local setting key 201 is a key for selecting a mode in which the protection setting is made as a local setting that is a setting specific for a scene, and the global setting key 202 is a key for selecting a mode in which the protection setting is made as a global setting that is a setting for the whole device. The protection setting made as the local setting becomes part of the current data and is stored as the local setting for a scene of a store destination when the current data is stored, so that the setting is reflected only when the scene is recalled. On the other hand, the protection setting made as the global setting becomes a setting common to each scene. Note that these keys 201 and 202 are selected in a toggle manner such that when one of these is pressed, the ON/OFF state of all the keys other than these keys are changed to reflect the current setting status on the selected mode.

The enabled/disabled key 203 is a key for setting the protection setting being enabled or disabled in the toggle manner. The local protection will be reflected at the time of recall for a scene for which the local setting is set to be enabled, while the global setting is reflected at the time of recall for a scene for which the local setting is set to be disabled. Besides, when the global setting is also disabled in this case, parameters are not protected, and thus all the parameters are recalled.

In use of the mixer, the common protection setting is used for almost all of the scenes and a special protection setting is made for only part of the scenes in many cases. Accordingly, the above described function allows the global setting to be made for the common protection setting in advance and the local setting to be made enabled only for a scene for which the special protection setting is made, whereby the local setting can be reflected without modifying the global setting, so that a mixer which has excellent operability and perfectly fits use cases can be configured. Further, in this case, since the local setting can be made without consideration of the relation with the global setting, the result of recall processing can be easily predicted when a setting is made, facilitating the setting.

The clear all key 204 is a key for returning all of the keys in each of the selection sections 207 to 210 to the OFF state and is provided to improve the operability when the setting is made again from the beginning.

The safe mode key 205 and the recall mode key 206 are keys for selecting a selection mode when selecting channels and parameters by each key in each of the selection sections 207 to 210. The safe mode key 205 is a key for selecting a safe mode that is a first mode where a channel or parameter which is not to be recalled (is protected) is selected by turning ON the corresponding key, and the recall mode key 206 is a key for selecting a recall mode that is a second mode where a channel or parameter which is to be recalled (is not protected) is selected by turning ON the corresponding key. When recall of many parameters is desired, selection of the safe mode enables efficient setting, and conversely when recall of only few parameters is desired, selection of the recall mode results in good efficiency.

The selection by the keys 205 and 206 is in a toggle manner and when the selection thereof is changed, the ON/OFF state of each key in each of the selection sections 207 to 210 is also changed to keep the setting status at that point in time. It should be noted that when the clear all key 204 is pressed, all of the keys in each of the selection sections 207 to 210 are returned to the OFF state in either mode.

The input channel selection section 207 is a section where keys for selecting input channels for which the protection setting is changed are provided, in which 48 keys are provided corresponding to 48 channels constituting the input channels. When any of the keys is pressed, a key group for making detailed protection settings for its input channel is displayed in the parameter selection section 210 with the current setting contents reflected.

These protection settings will be made for each predetermined group. The protection settings in this case are made such that the keys of FADER and ON select or selection-release the parameters of the fader and the ON of the fader & ON 144 respectively, PAN and ROUTING, EQ, COMP, GATE, and AUX SND and AUX ON select or selection-release the parameters of the pan & routing 145, the equalizer 141, the compressor 143, the noise gate 142, and the AUX ON & send level 146, respectively, and an ALL key 211 selects or selection-releases all the parameters on the selected channels by one operation. The parameters corresponding to each of these keys are parameters belonging to one group, and the protection settings will be made on a group-by-group basis. Note that some groups include a plurality of parameters, for example, the parameters of the equalizer 141 include parameters such as frequency characteristics, gain, Q value, and the like on each equalizer of three bands LOW, MID, and HIGH, and other groups include only one parameter as the parameter of the ON.

The protection settings for the parameters of each group for each channel can be made by operating these keys. Further, for a channel for which being unaffected by a recall (being affected in the recall mode) is set for at least part of groups, the keys corresponding to the channel are displayed in the ON state in the input channel selection section 207.

In the bus selection section 208, as in the input channel selection section 207, keys for selecting the various buses 127 for which the protection setting is changed are provided. When the keys are pressed, key groups for making detailed protection setting for the various buses 127 are displayed in the parameter selection section 210 with the current setting contents reflected. The display in this case is different from the display of the input channel shown in FIG. 5 with the difference in the kind of parameter, but its function is similar to that in FIG. 5, and therefore its detailed illustration and description will be omitted.

Besides, in the effector selection section 209, keys for making the protection settings for the parameters of the internal effectors 123 are provided, and, as for the internal effectors 123, the whole parameters on one effector form one group so that the keys provided in the effector selection section 209 directly select or selection-release the protection setting thereof.

Through use of the recall safe setting screen 200 described above, the digital mixer can accept the protection settings defining, on a group-by-group basis, parameters which are not recalled at the time of recall as a setting for each scene and a setting common to each scene separately, and accept an enabled or disabled setting of the protection setting for the scene for each scene. It should be noted that the methods of selecting the protection object in the safe mode and the recall mode are different in the recall safe setting screen 200, but the contents of the protection settings are finally identified whether to be protected or not in accordance with ON/OFF of the key (selection/non-selection for each group) and the mode, and stored in accordance with a flag indicating whether or not the contents are protected for each parameter group.

The processing on the acceptance of the above protection setting is performed by the CPU 11 executing a predetermined control program, in which processing the CPU 11, the controls on the console panel 100, and the like function as a protection accepting handler.

Figure 6:
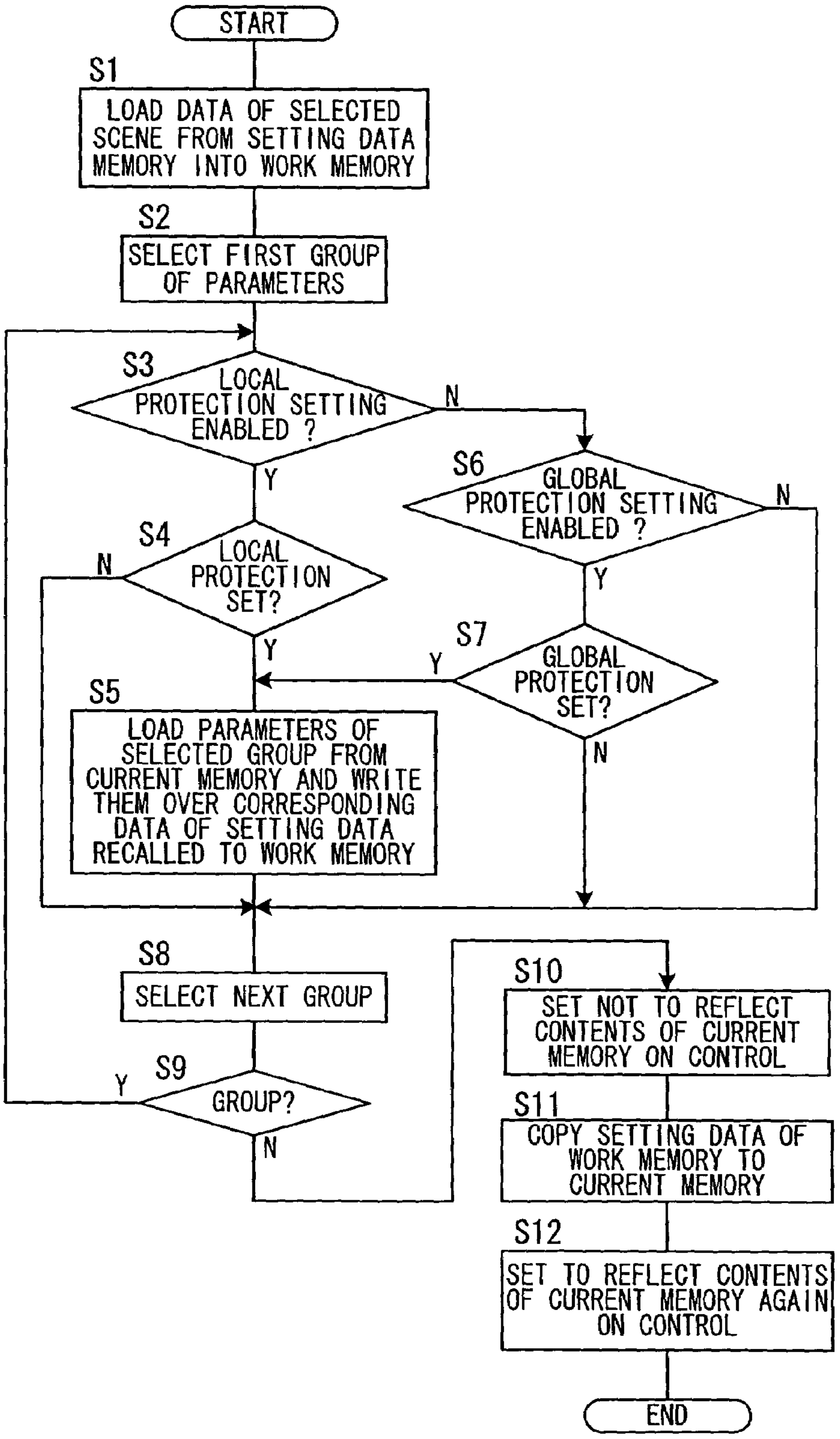
FIG. 6 is a flowchart showing processing executed at the time of recalling a scene in the digital mixer shown in FIG. 1.

Processing executed at the time of recalling a scene in the digital mixer will be described next using FIG. 6. FIG. 6 is a flowchart showing the processing.

In this digital mixer, when a scene is selected in the scene operation section 40 and a recall of the scene is instructed, the CPU 11 executes the predetermined control program stored in the flash memory 12 to start the processing shown in the flowchart of FIG. 6. The CPU 11 executes the processing to thereby function as a recaller.

In this processing, in Step S1, data of the selected scene is first loaded from the setting data memory into the work memory.

Then, through the processing in Steps S2 to S9, the protection setting is referred to for each parameter group, and only parameters of the group for which being unaffected by a recall (protection) is set are loaded from the current memory and written over corresponding data of the setting data recalled to the work memory. As for the protection setting here, the local protection setting is referred to when the local protection setting for the setting data is enabled, and the global protection setting at that point in time is referred to when the local protection setting is disabled. When the global protection setting is also disabled, any parameter is handled as having no protection set.

In the above processing in Steps S2 to S9, the CPU 11 functions as a protector. Note that by the processing until Step S9, setting data in which parameters which are not recalled of the scene being a recall object are changed into the same values as those of the current data will be stored in the work memory. Accordingly, the setting data stored in the work memory at this point in time is used as the current data, whereby recall of the scene is performed in accordance with the protection setting.

Figure 9:
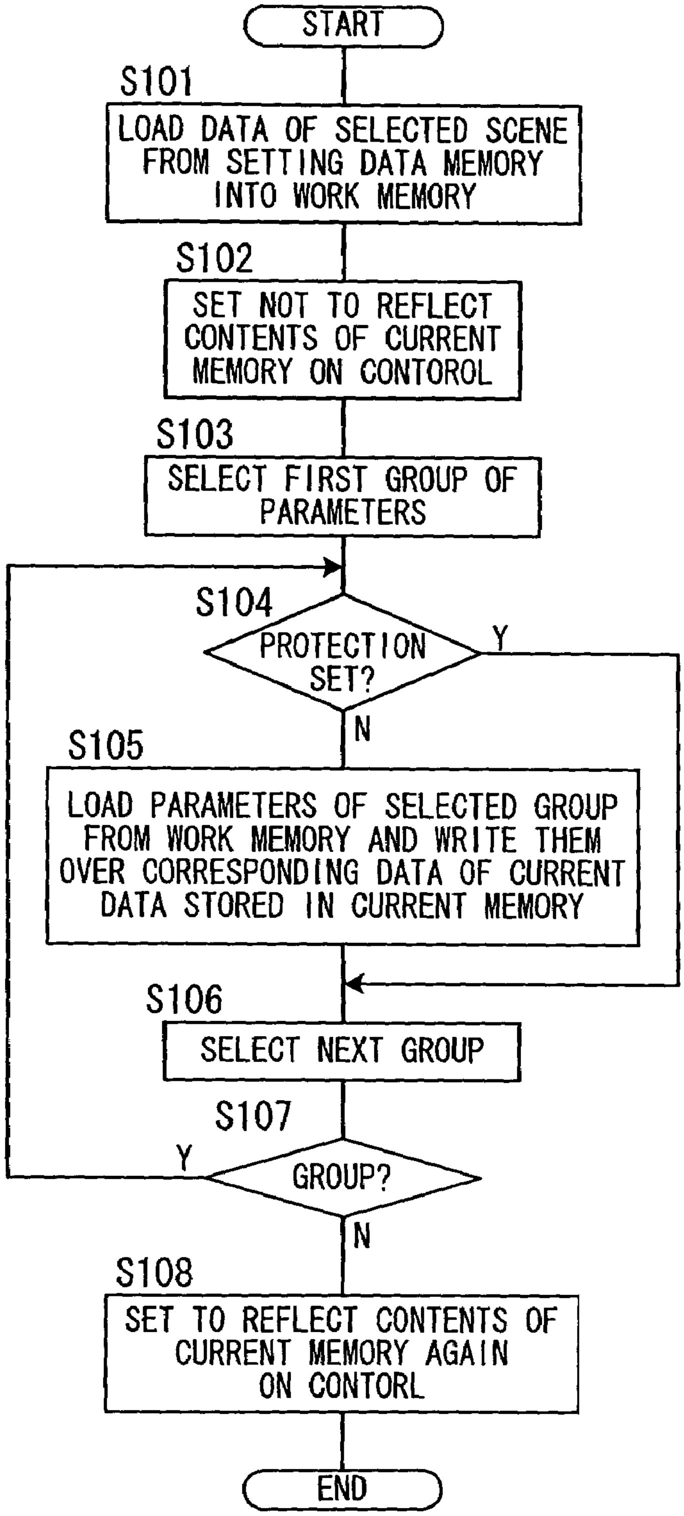
F I G. 9 RELATED ART
FIG. 9 is a flowchart showing an example of processing executed at the time of recalling a scene in a conventional digital mixer.

Then, processing in subsequent Steps S10 to S12 is performed in which the setting data in the work memory is copied to the current memory to be used as new current data, and the processing is ended. In this case, as in the case of FIG. 9 illustrated in the Related Art, setting is made such that the contents of the current memory during execution of copy are not reflected on the control of the signal processing and the like. In the processing in Steps S10 to S12, the CPU 11 functions as a current data switcher.

By performing the processing as described above, high-speed recall processing becomes possible even in the case in which setting of performing no recall for part of data at the time of recall is possible.

More specifically, since there are often few parameters for which protection is set at the time of normal use, not parameter with no protection set but parameters with protection set are transferred in sequence, whereby the number of times of individually transferring data can be substantially reduced. If protection is set for parameters of only two groups out of 100 groups, 98 times of transfer need to be performed in the conventional method illustrated using FIG. 9, while only two times of transfer are sufficient in the method described here.

In the method described here, however, it is necessary to transfer the setting data in the work memory to the current memory at the end. However, since data having a size up to some degree can be transferred in a similar period of time through use of burst transfer, this processing does not require so much time as compared to the case in which data in a small size is transferred many times. Accordingly, time period required for data transfer can be substantially reduced as a whole to increase the speed of the recall processing.

Note that the setting data can be used as current data even by changing at least a region of the work memory storing the setting data into the current memory instead of transfer of the setting data to the current memory. Such a change can be accomplished, for example, by changing the value of a pointer indicating the address of the current memory. Such arrangement can further reduce the time period required for data transfer to further increase the speed of the recall processing though the management of the memory becomes somewhat complex.

Besides, it is not essential to perform judgments in Steps S3 and S6 for each group, and once which protection setting is referred to is determined, the setting may be directly referred to.

Figure 7:
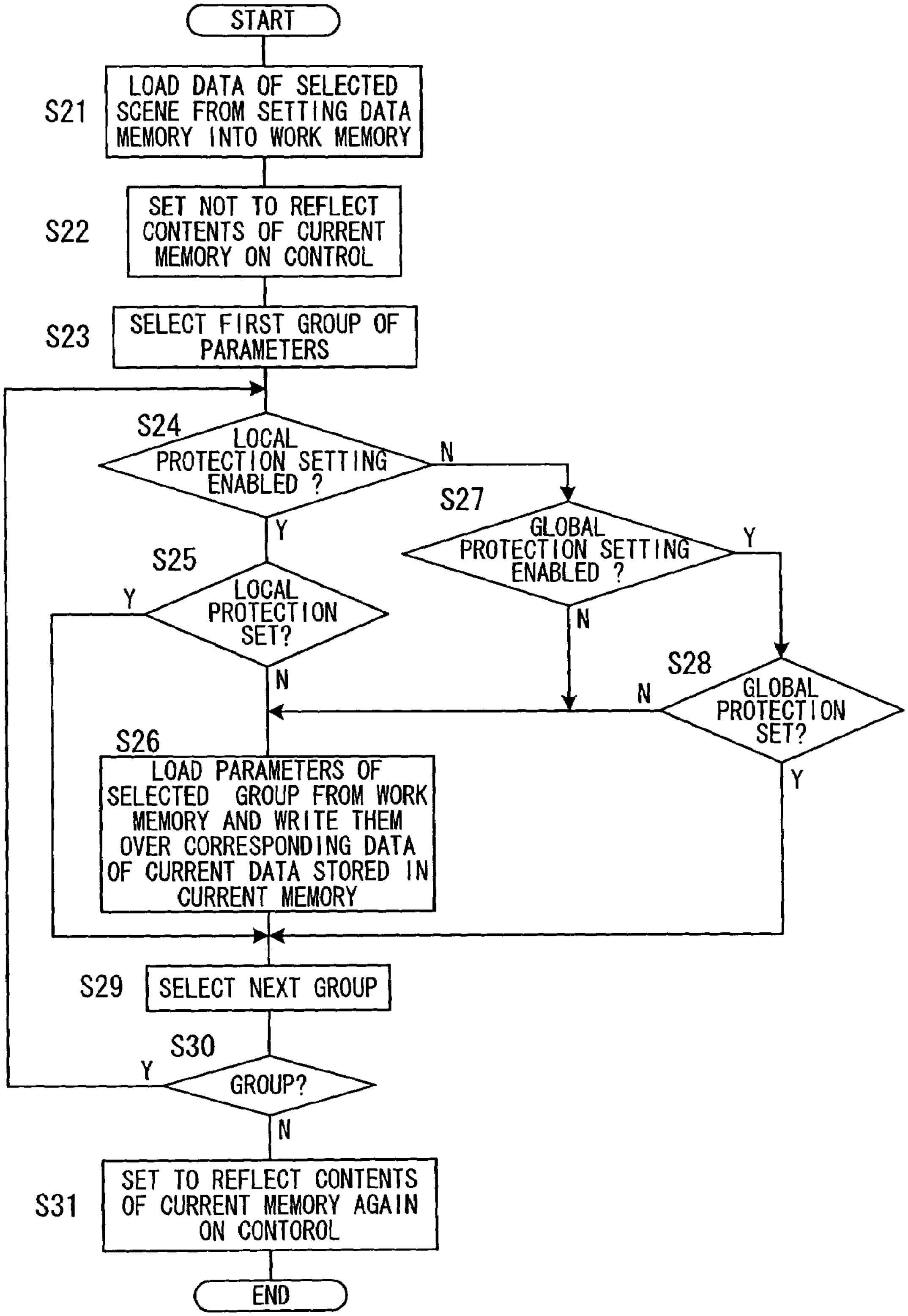
FIG. 7 is a flowchart showing processing, corresponding to that in FIG. 6, in a modification example of the embodiment of the invention.
Figure 8:
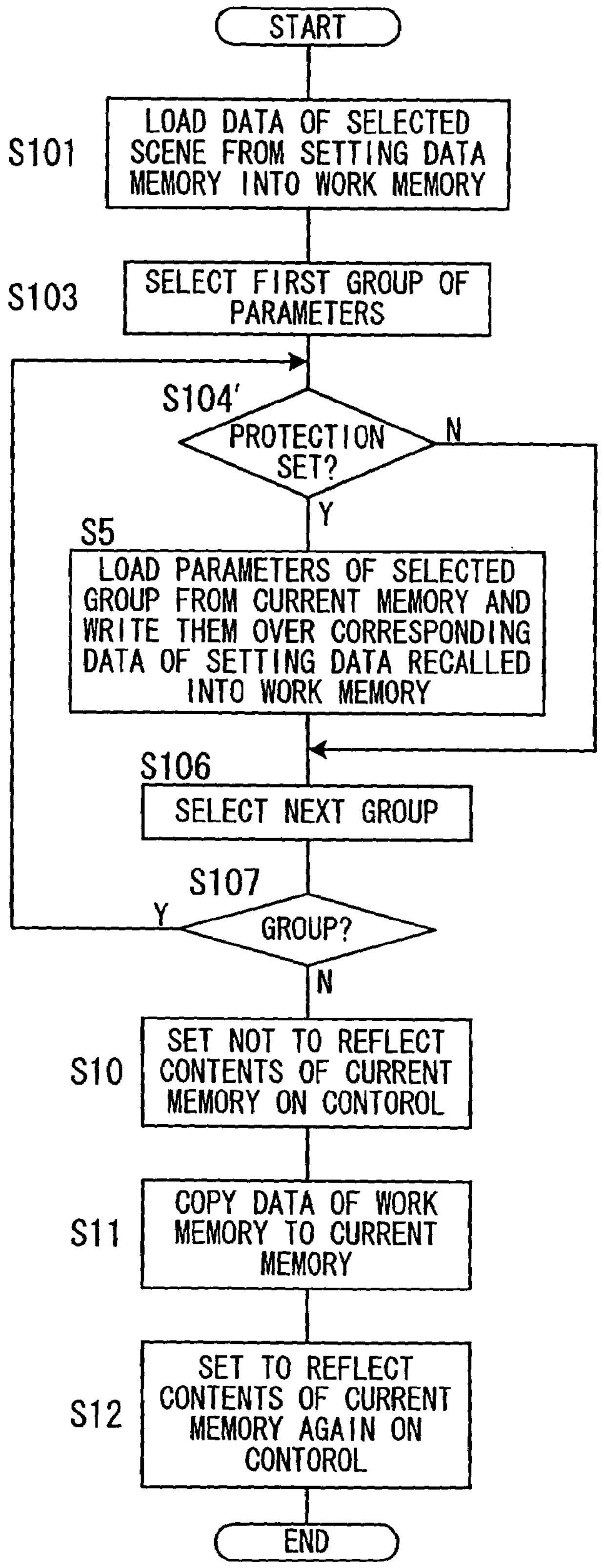
FIG. 8 is a flowchart showing processing in another modification example of the same.

Modification Example FIG. 7 and FIG. 8

A modification example of the above-described embodiment will be described.

In the above-described embodiment, it is also adoptable to copy the parameters of a group for which no protection is set from the work memory to the current memory as in the conventional case illustrated using FIG. 9. In this case, the processing executed at the time of recalling a scene is as shown in a flowchart of FIG. 7.

In this processing, in Step S21, data of the selected scene is first loaded from the setting data memory into the work memory. Then, in Step S22, setting is made such that the contents of the current memory during rewriting are not reflected on the control of the signal processing and the like until the rewriting at the time of recall is finished.

Thereafter, through the processing in Steps S23 to S30, the protection setting is referred to for each parameter group, and only parameters of the group for which being affected by a recall is set (protection is not set) are loaded from the work memory and written over corresponding data of the current data stored in the current memory so as to be made current data. The protection setting to be referred to is the same as that in the case of the processing shown in FIG. 6.

After overwriting of all the necessary parameters is finished, setting is made such that the contents of the current memory are reflected again on the control in Step S31, and the processing is ended.

In this arrangement, the speed of the recall processing is at the same level as that in the conventional case, but the effect of improving the operability resulting from acceptance of the enabled or disabled setting of the local setting of protection can be obtained as in the above-described embodiment.

Incidentally, where the selection of parameters to be protected is accepted in the recall mode, it is conceivable that setting is made such that many parameters should be protected. This is because the recall mode, as described above, is a mode capable of efficiently making setting in such a case. In addition, it is conceivable that in such a case the number of times of data transfer unintentionally increases in the processing shown in FIG. 6, resulting in a decrease in the speed of the recall processing. On the contrary, the number of times of data transfer can be reduced more by loading the parameters of the group for which no protection is set and writing them over data in the current memory as in the prior art.

Hence, it is also adoptable to store whether the protection setting is accepted in the safe mode or in the recall mode, so that, at the time of recall processing of a scene, the kind of protection setting to be referred to is examined after the loading of the data of the selected scene into the work memory to selectively perform the processing such that the processing shown in FIG. 6 is performed in the case of the safe mode or the processing shown in FIG. 7 is performed in the case of the recall mode in accordance with in which mode the protection setting is accepted.

In such an arrangement, transfer processing suited for the contents of the protection setting predicted from the mode can be performed to further increase the speed of the recall processing as a whole.

Alternatively, as another modification example, it is also adoptable to apply to the conventional mixer illustrated using FIG. 9 the processing of loading the parameters for which the protection is set from the current memory and writing them over corresponding data of the setting data recalled to the work memory, as in the above-described embodiment. In this case, the processing performed at the time of recalling a scene is as shown in a flowchart of FIG. 8. Processing in each step constituting the above processing is similar to the processing with the same number shown in FIG. 6 or FIG. 9. Note that the branch directions are opposite to those in Step S104'.

In the case thus arranged, the effect of improving the operability in the above-described embodiment cannot be obtained as a matter of course, but the effect of increasing the speed of the recall processing can be obtained as in the case of the above-described embodiment.

Besides, as for the method of reflecting the local and global protection settings, the method of omitting from the recall object the parameters for which being unaffected by a recall is set at least in one of the protection settings, which has been described in the section of Summary of the Invention, is not always inferior to the method of the above-described embodiment, but may be more preferable than the method of the embodiment. Hence, it is adoptable to allow either of the methods to be selected. This arrangement enables an optimal method to be selected in accordance with a user's wish, resulting in further improvement in the operability of the whole mixer.

Further, it is also adoptable to provide a control for making all the local protection settings temporarily disabled separately from the enabled or disabled setting. In this case, in the case of the control being operated, the CPU 11 recognizes that the local protection settings for all scenes is disabled when performing the processing shown in FIG. 6 and so on, and in the case of the control being operated again, the CPU 11 performs the processing in accordance with the enabled or disabled setting as before. In this arrangement, even when an inconvenience will be caused by reflection of the local protection settings, such as when a situation different from the plan will occur, the local protection settings can be made disabled and the global protection setting can be reflected by one touch, thereby improving the convenience of the device.

As for the global protection setting, a control having a similar function may be provided.

While the example in which the protection settings for the parameters of each group for each channel can be performed by each key in the input channel selection section 207 and the parameter selection section 210 has been described in the above-described embodiment, the protection settings made in the parameter selection section 210 may be applied in common to all the channels selected in the input channel selection section 207.

Furthermore, the location of the controls and the display on the screen, the kind and the unit of grouping of parameters and the selection method thereof, and so on are not limited to the above. Moreover, the invention is applicable not only to the above-described digital mixer but also to various audio signal processing devices including a recorder, an editor, and an electronic musical instrument as a matter of course.

Besides, a program for causing the above-described mixer to realize the above-described functions is stored in the flash memory 12 or the like in advance, or otherwise it is provided, stored in a non-volatile memory such as a CD-ROM, a flexible disc, or the like so that the CPU 11 loads the program from the memory into the RAM 13 and executes it, or the CPU 11 downloads the program from an external device with a memory storing the program or from an external device storing the program in a storage means such as a hard disk drive (HDD) or the like and executes it, whereby the same effects can also be obtained.

As has been described, with the audio signal processing device of the invention, it can be made possible to predict the result of the recall processing with ease while enabling the parameter being a recall object to be changed for each setting data without modifying the setting for the whole device. Further, it is possible to increase the speed of the recall processing of the setting data.

Further, with the program of the invention, it is possible to cause a computer to function as such an audio signal processing device to realize the above-described characteristics, thereby obtaining similar effects.

What is claimed is:

1. An audio signal processing device which processes audio signals and outputs the audio signals, comprising:

a setting data memory for storing a plurality of setting data each comprising a plurality of groups of data representing a setting status of said device;

a current memory for storing current data representing a current status of said device;

a controller for controlling the signal processing based on the current data;

a recaller for recalling the setting data stored in said setting data memory and making the data the current data;

a first handler for accepting protection setting as a setting for each of the setting data and a setting common to each of the setting data separately, said protection setting defining a group which is not recalled at the time of recalling by said recaller among the plurality of groups constituting the setting data; and a second handler for accepting an enabled or disabled setting of the protection setting for each of the setting data, wherein when recalling the setting data, said recaller performs a recall in accordance with the protection setting for the setting data when the protection setting for the setting data is enabled, and in accordance with the protection setting common to each of the setting data when the protection setting for the setting data is disabled.

2. An audio signal processing device according to claim 1, further comprising:

a third handler for temporarily disabling all the protection setting for each of the setting data.

3. An audio signal processing device which processes audio signals and outputs the audio signals, comprising:

a setting data memory for storing a plurality of setting data each comprising a plurality of groups of data representing a setting status of said device;

a current memory for storing current data representing a current status of said device;

a controller for controlling the signal processing based on the current data;

a recaller for recalling the setting data stored in said setting data memory to said current memory as the current data; and a protection accepting handler for accepting protection setting defining a group which is not recalled at the time of recalling by said recaller among the plurality of groups, wherein said recaller comprises:

a handler for recalling setting data to be recalled from said setting data memory to a work memory;

a protector for loading data of a group which is defined as not being recalled by the protection setting among the current data from said current memory, and writing the data over corresponding data of the setting data recalled to said work memory; and a current data switcher for causing the setting data stored in said work memory to be used as the current data after completion of the overwriting for all necessary data by said protector.

4. An audio signal processing device according to claim 3, wherein said current data switcher causes the setting data stored in said work memory to be used as the current data by copying contents of said work memory to said current memory.

5. An audio signal processing device according to claim 3, wherein said current data switcher causes the setting data stored in said work memory to be used as the current data by changing at least a part of said work memory into said current memory.

6. An audio signal processing device according to claim 3, wherein said protection accepting handler is provided with a handler for accepting the protection setting in a first mode of accepting selection of a group which is not recalled and a second mode of accepting selection of a group which is recalled, and wherein when said protection accepting handler accepts the protection setting in the second mode, said protector and said current data switcher are not operated, and said recaller loads data of a group which is recalled among the setting data to be recalled from said setting data memory and writes the data over corresponding data of the current data stored in said current memory.

7. A computer-readable medium containing a set of program instructions executable by a computer and causing said computer to execute:

a process of processing audio signals and outputting the audio signals;

a process of storing in a setting data memory a plurality of setting data each comprising a plurality of groups of data representing a setting status on the signal processing;

a process of storing in a current memory current data representing a current setting status of the signal processing;

a recall process of recalling the setting data stored in the setting data memory and making the data the current data;

a process of accepting protection setting as a setting for each of the setting data and a setting common to each of the setting data separately, the protection setting defining a group which is not recalled at the time of recalling in said recall process among the plurality of groups constituting the setting data; and a process of accepting an enabled or disabled setting of the protection setting for each of the setting data, wherein, in said recall process, at the time of recalling the setting data, the recall is performed in accordance with the protection setting for the setting data when the protection setting for the setting data is enabled, and in accordance with the protection setting common to each of the setting data when the protection setting for the setting data is disabled.

8. The computer-readable medium according to claim 7, further containing program instructions for causing said computer to execute a process of temporarily disabling all the protection settings for each of the setting data.

* * * * *